United States Patent
Khatri et al.

(10) Patent No.: US 12,216,765 B2
(45) Date of Patent: Feb. 4, 2025

(54) IDENTITY-BASED VERIFICATION OF SOFTWARE CODE LAYERS

(71) Applicant: Dell Products L.P., Round Rock, TX (US)

(72) Inventors: Mukund P. Khatri, Austin, TX (US); Eugene David Cho, Austin, TX (US); Milton Olavo Decarvalho Taveira, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 201 days.

(21) Appl. No.: 17/973,793

(22) Filed: Oct. 26, 2022

(65) Prior Publication Data

US 2024/0143769 A1 May 2, 2024

(51) Int. Cl.
*G06F 21/57* (2013.01)
*G06F 21/60* (2013.01)
*H04L 9/32* (2006.01)

(52) U.S. Cl.
CPC .......... *G06F 21/575* (2013.01); *G06F 21/602* (2013.01); *H04L 9/3247* (2013.01)

(58) Field of Classification Search
CPC ..... G06F 21/575; G06F 21/602; H04L 9/3247
See application file for complete search history.

(56) References Cited

U.S. PATENT DOCUMENTS

| | | | | |
|---|---|---|---|---|
| 11,665,001 | B1 * | 5/2023 | Engelkemier | H04L 9/30 713/2 |
| 2009/0055658 | A1 * | 2/2009 | Hyser | G06F 21/575 726/16 |
| 2020/0119929 | A1 * | 4/2020 | Edwards | H04L 9/3265 |
| 2021/0176056 | A1 * | 6/2021 | Cai | H04L 9/3265 |
| 2023/0128099 | A1 * | 4/2023 | Nunez Mencias | G06F 21/53 726/26 |
| 2023/0214491 | A1 * | 7/2023 | Cheng | H04L 9/3236 713/2 |

OTHER PUBLICATIONS

Zhou, Lei; "Build Highly Secure IOT Device: Secure Boot, Measured Boot and Attestation, Secure Storage etc."; https://medium.com/@zlhk100/build-highly-secure-iot-device-secure-boot-measured-boot-and-attestation-secure-storage-etc-678ada06270f; downloaded on Oct. 20, 2022.

(Continued)

*Primary Examiner* — Nimesh G Patel
(74) *Attorney, Agent, or Firm* — Ryan, Mason & Lewis, LLP (57) ABSTRACT

Techniques are provided for identity-based verification of software code layers. One method comprises obtaining, by a current layer of software code executing on a security processor of a security sub-system, in connection with a boot of the security sub-system, an identity key of the current layer, wherein the identity key of the current layer is based on a value generated during a provisioning of the security sub-system, wherein the value is based on a firmware image of at least one layer of the software code; obtaining an encrypted secure boot public key of a next layer; decrypting the encrypted secure boot public key of the next layer using the obtained identity key of the current layer; verifying the next layer using the decrypted secure boot public key of the next layer; and executing the next layer based at least in part on a result of the verifying.

20 Claims, 8 Drawing Sheets

(56) References Cited

OTHER PUBLICATIONS

"Using the TPM to Solve Today's Most Urgent Cybersecurity Problems"; Trusted Computing Group, May 20, 2014.
Tao et al.; "DICE*: A Formally Verified Implementation of DICE Measured Boot"; University of California, Davis, Microsoft Research; downloaded on Oct. 20, 2022.
"Security Subsystems for Systems-on-Chip (SoCs), Common Concepts and Usage Paradigms of Security Subsystems"; www.nxp.com; downloaded on Oct. 20, 2022.

* cited by examiner

IDENTITY-BASED VERIFICATION OF SOFTWARE CODE LAYERS

FIELD

The field relates generally to information processing systems, and more particularly to provisioning in such information processing systems.

BACKGROUND

Devices, such as servers and storage appliances, increasingly have one or more sub-systems (e.g., one or more systems on a chip) that support both secure and measured boot functionality. Typically, software code must pass a secure boot verification before it can be executed on such a sub-system. With a measured boot process, integrity measurements are performed for each layer of software code in a boot sequence by the prior layer.

SUMMARY

In one embodiment, a method comprises obtaining, by a current layer of a plurality of layers of software code executing on a security processor of a security sub-system, in connection with a boot of the security sub-system, an identity key of the current layer of software code, wherein the identity key of the current layer of software code is based at least in part on at least one value generated during a provisioning of the security sub-system, wherein the at least one value is based at least in part on a firmware image of at least one layer of the plurality of layers of software code; obtaining an encrypted secure boot public key of a next layer of software code; decrypting the encrypted secure boot public key of the next layer of software code using the obtained identity key of the current layer of software code; verifying the next layer of software code using the decrypted secure boot public key of the next layer of software code; and initiating execution of the next layer of software code based at least in part on a result of the verifying.

In some embodiments, the identity key of the current layer of software code is based at least in part on one or more of (i) a first value generated by applying at least one function to one or more values stored in a secure memory of the security sub-system, and (ii) a second value generated by applying at least one function to the firmware image of the at least one layer of the plurality of layers of software code. The identity key of the current layer of software code may be generated by applying a key derivation function to the first value and the second value.

In one or more embodiments, an execution of the next layer of software code may be prevented responsive to the next layer of software code failing to verify. The verifying the next layer of software code may comprise verifying a signature associated with the next layer of software code. The decrypting the encrypted secure boot public key of the next layer of software code using the obtained identity key of the current layer of software code may require the identity key of the current layer of software code that is based at least in part on the at least one value generated during the provisioning of the security sub-system.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for identity-based verification of software code layers. In some embodiments, the disclosed techniques for identity-based verification of software code layers may be employed to detect anomalous or unexpected boot images corresponding to such software code layers.

As noted above, hardware devices increasingly have one or more sub-systems (e.g., one or more systems on a chip) that support both secure and measured boot functionality. In addition, one or more aspects of the disclosure recognize that unique "per-product" secure boot keys are not scalable. Thus, the same secure boot key may be used for multiple customers and products, allowing software code of a first entity to potentially successfully boot up on the device of another entity, for example, since the software code of both entities may be signed using the same secure boot key.

In one or more embodiments of the disclosure, one or more layers of software code of a given customer are bound to a given security sub-system on which the one or more layers of software code will execute using hardware-based identity keys. In some embodiments of the disclosed identity-based boot verification techniques, a first layer of software code of a given customer, sometimes referred to as customer L0 software code, may be used, together with one or more hardware-based values associated with a given security sub-system, to generate an L0 identity key that is then used to encrypt a secure boot public key associated with the next layer of software code.

In this manner, a key wrapping technique is employed in at least some embodiments, whereby secure boot keys of the next software layer are wrapped with the identity key of the previous software layer. For example, unique-per-security sub-system identity keys, such as the L0 identity key, can be used to wrap unique-per-entity (e.g., customer) secure boot keys, to create attestable unique per-product secure boot keys.

Figure 1:
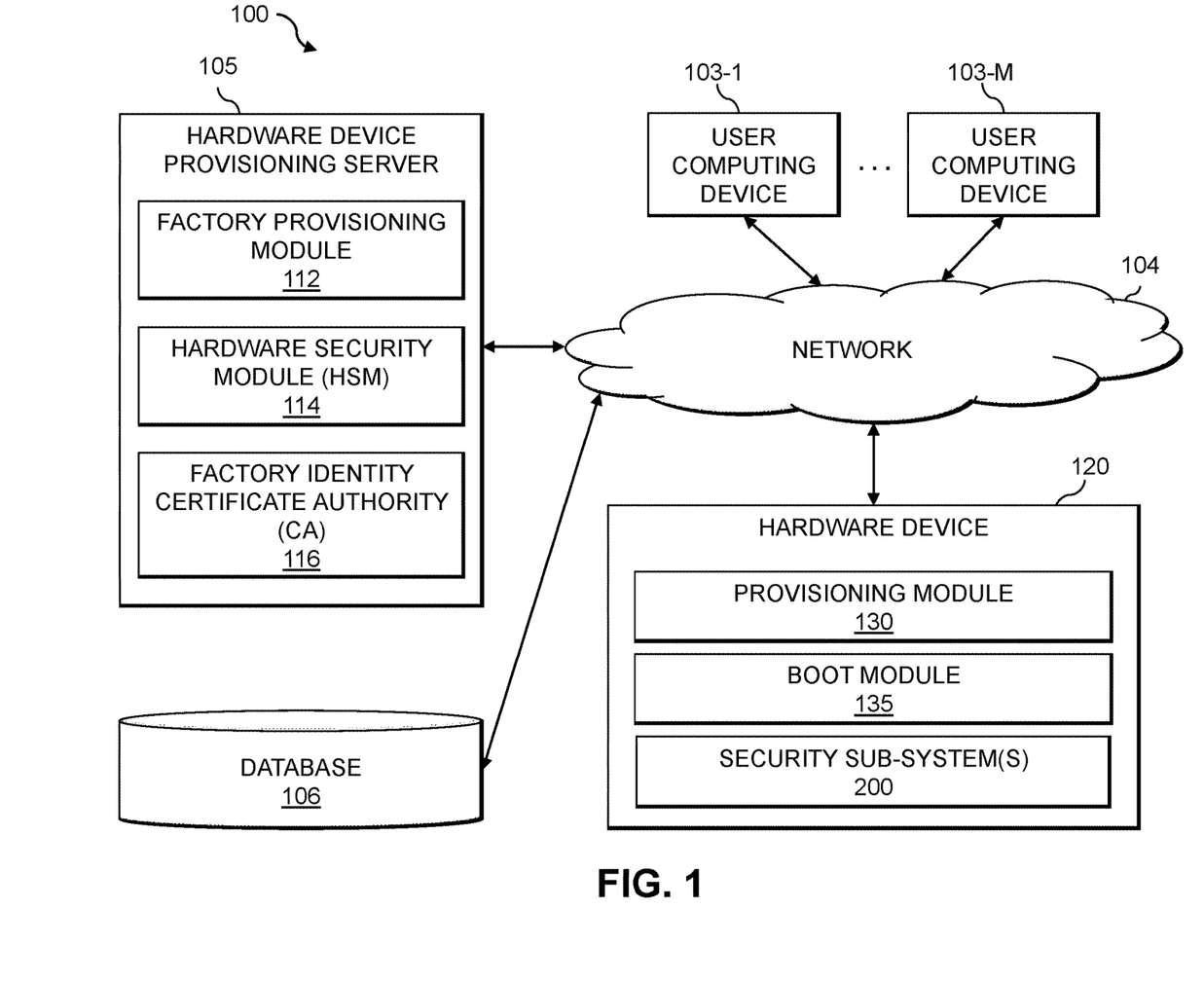
FIG. 1 illustrates an information processing system configured for identity-based verification of software code layers in accordance with an illustrative embodiment.

FIG. 1 illustrates a computer network (also referred to herein as an information processing system) 100 configured for identity-based verification of software code layers in accordance with an illustrative embodiment. The computer network 100 comprises a plurality of user computing devices 103-1 through 103-M, collectively referred to herein as user computing devices 103. The user computing devices 103 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is one or more hardware device provisioning servers 105, one or more databases 106, and one or more hardware devices 120, discussed below.

The user computing devices 103 and/or hardware devices 120 may comprise, for example, host devices, storage appliances and/or devices such as mobile telephones, laptop computers, tablet computers, desktop computers or other types of computing devices. Such devices are examples of what are more generally referred to herein as "processing devices." Some of these processing devices are also generally referred to herein as "computers." The user computing devices 103 and/or hardware devices 120 may comprise a network client that includes networking capabilities such as ethernet, Wi-Fi, etc. When the user computing devices 103 and/or hardware devices 120 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices.

The user computing devices 103 and/or hardware devices 120 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

It is to be appreciated that the term "user" in this context and elsewhere herein is intended to be broadly construed so as to encompass, for example, human, hardware, software or firmware entities (including services), as well as various combinations of such entities. Compute and/or storage services may be provided for users under a Platform-as-a-Service (PaaS) model, a Storage-as-a-Service (STaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

As shown in FIG. 1, an exemplary hardware device provisioning server 105 may comprise a factory provisioning module 112, a hardware security module (HSM) 114, and a factory certificate authority (CA) 116. In the example of FIG. 1, the factory provisioning module 112 provisions one or more hardware devices 120, as discussed further below in conjunction with FIG. 3. The hardware security module 114 and factory CA 116 may be employed to provide a source of trust for a hardware device being provisioned, as discussed further below in conjunction with FIG. 3, for example.

It is to be appreciated that this particular arrangement of elements 112, 114, 116 illustrated in the hardware device provisioning server 105 of the FIG. 1 embodiment is presented by way of example only, and alternative arrangements can be used in other embodiments. For example, the functionality associated with elements 112, 114, 116 in other embodiments can be combined into a single element, or separated across a larger number of elements. As another example, multiple distinct processors can be used to implement different ones of elements 112, 114, 116 or portions thereof.

At least portions of elements 112, 114, 116 may be implemented at least in part in the form of software that is stored in memory and executed by a processor. An exemplary process utilizing elements 112, 114, 116 of the hardware device provisioning server 105 in computer network 100 will be described in more detail with reference to FIGS. 3 and 6, for example.

The hardware device provisioning server 105 may be implemented, for example, in a factory or other fabrication facility of an enterprise or another organization. In some embodiments, the hardware device provisioning server 105, or portions thereof, may be implemented as part of a host device.

Figure 2:
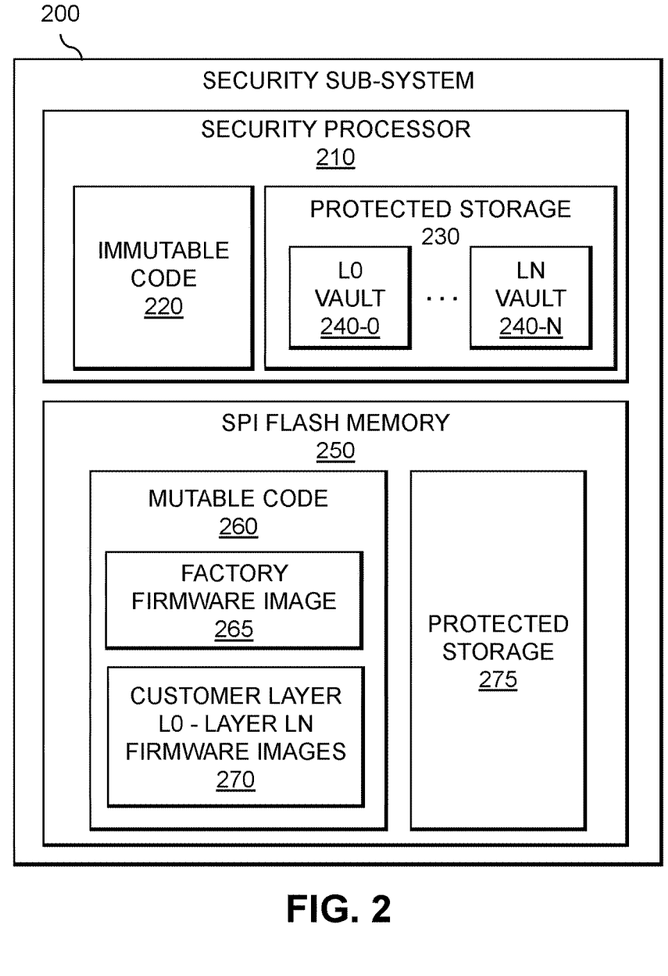
FIG. 2 illustrates a representative security sub-system in accordance with an illustrative embodiment.

As shown in FIG. 1, an exemplary hardware device 120 (e.g., a device being provisioned by the hardware device provisioning server 105) may comprise a provisioning module 130, a boot module 135 and one or more security sub-systems 200. The provisioning module 130 works in connection with the factory provisioning module 112 and performs provisioning aspects within the exemplary hardware device 120, as discussed further below in conjunction with FIG. 4. The boot module 135 implements a boot sequence (e.g., where immutable code, discussed below, is the first to boot). The boot module 135 will initiate the boot process of FIG. 4 for each security sub-system 200.

The one or more security sub-systems 200, as discussed further below in conjunction with FIG. 2, may comprise a security processor or another system on a chip, such as a baseboard management controller (BMC) (e.g., the Integrated Dell Remote Access Controller (iDRAC), commercially available from Dell Technologies), or another out-of-band (OOB) controller. In further variations, one or more of the one or more security sub-systems 200 may be implemented, for example, as a microprocessor, a microcontroller, an application-specific integrated circuit (ASIC), a field-programmable gate array (FPGA), a host processor module, a storage controller or other type of silicon-based processing circuitry, as well as portions or combinations of such circuitry elements.

In some embodiments, a trusted platform module (not shown in FIG. 1) may comprise one or more registers (e.g., platform configuration registers), a secure storage and a cryptographic processor that supports various cryptographic capabilities. The trusted platform module may employ such cryptographic capabilities to calculate one or more hash values based on software and/or firmware instructions utilized by certain components of the hardware device 120, such as the basic input/output system and/or a boot loader. Such hash values may be compared to reference hash values previously stored in a secure memory, for example, during a factory provisioning of the hardware device 120. In this manner, the trusted platform module may establish a root of trust to validate that other components of the hardware device 120 as using instructions that originate from a trusted source.

The hardware device 120, or portions thereof, implements a secure boot and measured boot that ensures that the hardware device 120 boots using only verified software. Generally, booting employs hardware-based procedures with firmware and software loaded into a memory. In a secure boot mode, a security processor evaluates the signature of each piece of boot software. The boot process continues to a next software layer if the signature is verified. The booting may involve one or more self-tests and a loading of one or more boot configuration parameters, as discussed further below in conjunction with FIG. 4, for example.

It is to be appreciated that this particular arrangement of elements 130, 135, 200 illustrated in the hardware device 120 of the FIG. 1 embodiment is presented by way of example only, and alternative arrangements can be used in other embodiments. For example, the functionality associated with elements 130, 135, 200 in other embodiments can be combined into a single element, or separated across a larger number of elements. As another example, multiple distinct processors can be used to implement different ones of elements 130, 135, 200 or portions thereof.

At least portions of elements 130, 135, 200 may be implemented at least in part in the form of software that is stored in memory and executed by a processor. An exemplary process utilizing elements 130, 135, 200 of the hardware device 120 in computer network 100 will be described in more detail with reference to FIGS. 2, 3 and 4, for example.

Additionally, the user computing devices 103, hardware device provisioning server 105 and/or the hardware device 120 can have an associated database 106 configured to store, for example, information related to firmware images and hardware and identity certificates, as discussed further below.

At least portions of the database 106 configured to store, for example, firmware images and certificate information may be implemented, for example, using a vault provided by an operating system of one or more of the user computing devices 103, hardware device provisioning server 105 and/ or the hardware device 120.

The database 106 in the present embodiment is implemented using one or more storage systems associated with the hardware device 120. Such storage systems can comprise any of a variety of different types of storage such as, network-attached storage (NAS), storage area networks (SANs), direct-attached storage (DAS) and distributed DAS, as well as combinations of these and other storage types, including software-defined storage.

The one or more user computing devices 103, hardware device provisioning server 105 and/or the hardware device 120 may be implemented on a common processing platform, or on separate processing platforms. The user computing devices 103 and/or hardware device provisioning servers 105 may be configured to interact over the network 104 in at least some embodiments with the hardware device 120.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the one or more user computing devices 103, hardware device provisioning server 105 and/ or the hardware device 120 can be one or more input-output devices (not shown), which illustratively comprise keyboards, displays or other types of input-output devices in any combination. Such input-output devices can be used, for example, to support one or more user interfaces to the user computing devices 103, hardware device provisioning server 105 and/or the hardware device 120, as well as to support communications between the user computing devices 103, hardware device provisioning server 105, hardware device 120 and other related systems and devices not explicitly shown.

The one or more user computing devices 103, hardware device provisioning server 105 and/or the hardware device 120 in the FIG. 1 embodiment are assumed to be implemented using at least one processing device. Each such processing device generally comprises at least one processor and an associated memory, and implements one or more functional modules for controlling certain features of the respective device.

More particularly, the one or more user computing devices 103, hardware device provisioning server 105 and/ or the hardware device 120 in this embodiment each can comprise a processor coupled to a memory and a network interface.

The processor illustratively comprises a microprocessor, a microcontroller, an ASIC, an FPGA or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the one or more hardware device provisioning servers 105, user computing devices 103 and/or hardware devices 120 to communicate in some embodiments over the network 104 with each other (as well as one or more other networked devices), and illustratively comprises one or more conventional transceivers.

It is to be understood that the particular set of elements shown in FIG. 1 for identity-based verification of software code layers is presented by way of illustrative example only, and in other embodiments additional or alternative elements may be used. Thus, another embodiment includes additional or alternative systems, devices and other network entities, as well as different arrangements of modules and other components.

FIG. 2 illustrates a representative security sub-system 200 in accordance with an illustrative embodiment. In the example of FIG. 2, security sub-system 200 comprises a security processor 210 and a Serial Peripheral Interface (SPI) flash memory 250. The security processor 210 comprises immutable code 220 and a protected storage 230. The protected storage 230 may be implemented, for example, as a one-time programmable (OTP) memory or a mask RAM (MROM), and comprises a vault 240-0 through 240-N for each respective layer 0 through N of software code. In some embodiments, the vaults 240 may alternatively be part of the SPI flash memory 250.

The security processor 210 may execute firmware instructions located in the protected storage 230 of the security processor 210. During its fabrication, one more protected memory devices accessible by the security processor 210 are programmed with immutable code 220 (e.g., a trusted boot ROM) that may be validated using a provided reference signature, as discussed further below. In this manner, the security processor 210 in at least some embodiments implements boot processes that operate using code from an immutable source.

In one or more embodiments, the security processor 210 may provide a root of trust (RoT) within components of the hardware device 120. Generally, a RoT operates using software code that has been verified with respect to authenticity and/or integrity. The security processor 210 anchors the root of trust using immutable code and cannot be modified by unauthorized parties.

In a secure boot mode, the security processor 210 evaluates the signature of each piece of boot software, and the boot process continues to a next software layer if the signature is verified, as discussed further below in conjunction with FIG. 4. The security processor 210 also employs DICE (Device Identifier Composition Engine), an integrated Trusted Platform Module (iTPM) or another measured boot technology.

In the example of FIG. 2, the SPI flash memory 250 comprises mutable code 260 and a protected storage 275. The mutable code 260 comprises a factory firmware image 265, discussed further below in conjunction with FIG. 3, and for example, one or more customer layer firmware images 270 corresponding to layers L0 through LN of customer software code. The customer layer firmware images 270 are discussed further below in conjunction with the provisioning process of FIG. 3. As noted above, in some embodiments, the vaults 240 may alternatively be part of the protected storage 275 of the SPI flash memory 250.

In some embodiments, the security sub-system 200 may be coupled to a motherboard of the hardware device 120. The security sub-system 200 may be implemented, for example, as a system on a chip (SoC), an FPGA, an ASIC or other type of silicon-based processing circuitry, as well as portions or combinations of such circuitry elements.

Figure 3:
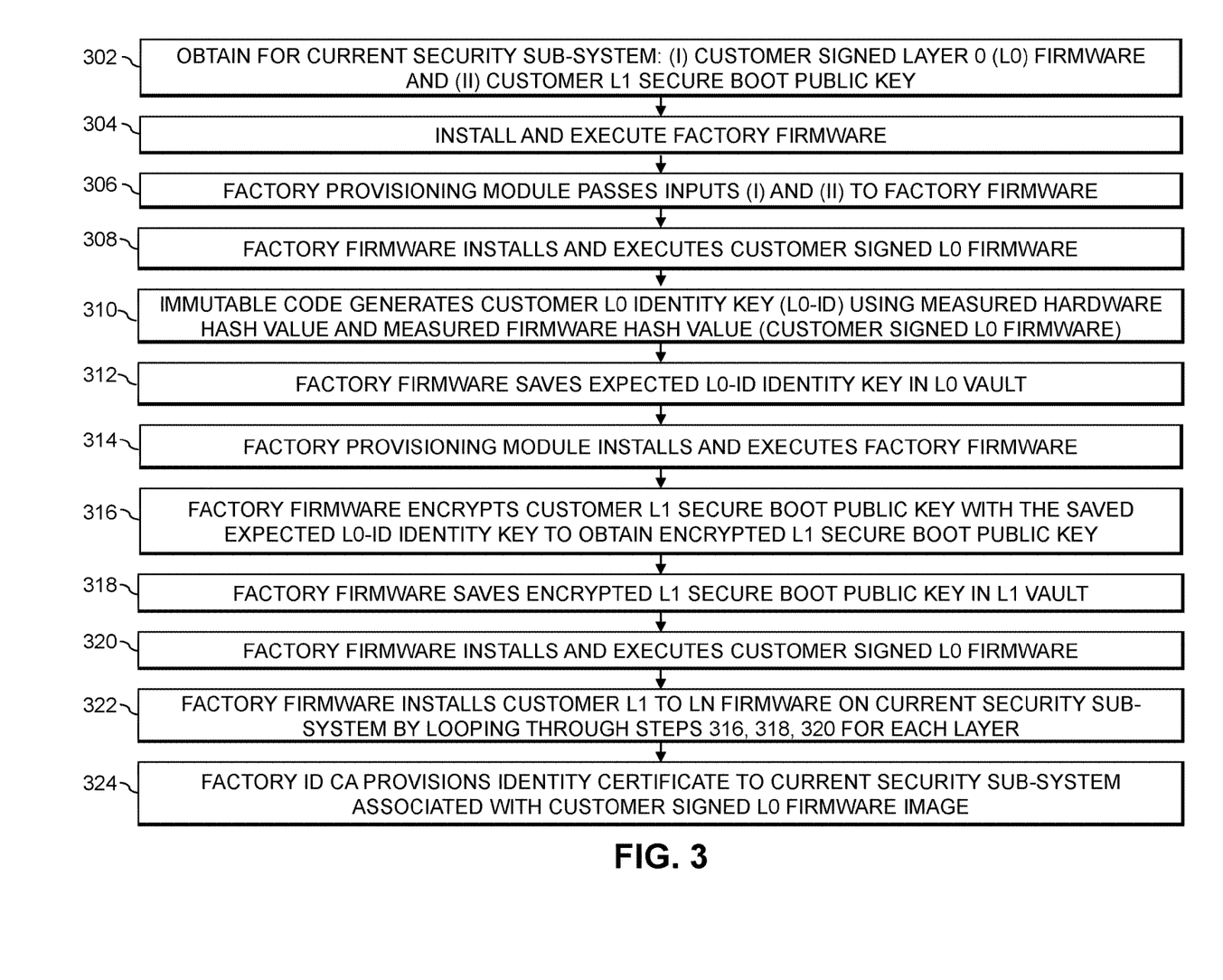
FIG. 3 is a flow chart illustrating an exemplary implementation of a provisioning process in accordance with illustrative embodiments.

FIG. 3 is a flow chart illustrating an exemplary implementation of a provisioning process in accordance with illustrative embodiments. In the example of FIG. 3, The current security sub-system, such as security sub-system 200: obtains (i) the customer signed layer 0 (L0) firmware and (ii) the customer L1 secure boot public key in step 302. The customer L0 software code is typically the first mutable code to execute in a boot process. In one or more embodiments, the customer L0 software code is assumed to be long lived, in the sense that it is allowed to change but any change will result in a new identity, requiring a new endorsement process (e.g., a remanufacturing or similar process) using the disclosed identity-based software code layer verification techniques. In this manner, the fact that the customer L0 software code can only change in the factory can be leveraged using the disclosed binding scheme to create a singular root of trust entity, comprising both immutable and mutable code.

In step 304, the factory firmware is installed and executed. The factory provisioning module 112 passes the inputs (i) and (ii) from step 302 to the factory firmware in step 306. The factory firmware installs and executes the customer signed L0 firmware in step 308.

In step 310, the immutable code 220 generates an identity key for the customer L0 software code, referred to as an L0-ID identity key, using a measured hardware hash value and a measured firmware hash value of the customer signed L0 firmware. In at least some embodiments, the measured hardware hash value is obtained by applying a hash function to one or more values in the protected storage 230 of the security sub-system 200 to capture a security state of the security sub-system 200. Likewise, the measured firmware hash value is obtained by applying a hash function to the customer signed L0 firmware. In this manner, the customer signed L0 firmware is bound or sealed to the specific hardware of the hardware device 120, such that any changes to this mutable code must be re-provisioned in the factory.

For example, the identity key of the customer L0 software code can be based on: (i) a hardware value generated by applying a hash function to one or more values stored in a secure memory of the security sub-system, and/or (ii) a firmware value generated by applying a hash function to the firmware image of the at least one layer of the plurality of layers of software code. In at least some embodiments, the identity key of the customer L0 software code is generated by applying a key derivation function to the hardware value and the firmware value.

The factory firmware saves the expected L0-ID identity key in the L0 vault 240-0 in step 312. In step 314, the factory provisioning module 112 re-installs and executes the factory firmware. The factory firmware encrypts the customer L1 secure boot public key in step 316 with the saved expected L0-ID identity key to obtain an encrypted L1 secure boot public key. In this manner, the The factory firmware then saves the encrypted L1 secure boot public key in the L1 vault 240-1. In step 320, the factory firmware installs and executes the customer signed L0 firmware. The factory firmware installs the subsequent software layers, e.g., customer L1 to LN firmware on the current security sub-system by looping through steps 316, 318, 320 for each software layer in step 322. In at least some embodiments, the identity keys for each layer are tied to the specific security sub-system 200, in a similar manner as described above for the L0-ID identity key.

In step 324, the factory ID CA 116 provisions the identity the TO current security sub-system 200 associated with the customer signed L0 firmware image.

Figure 4:
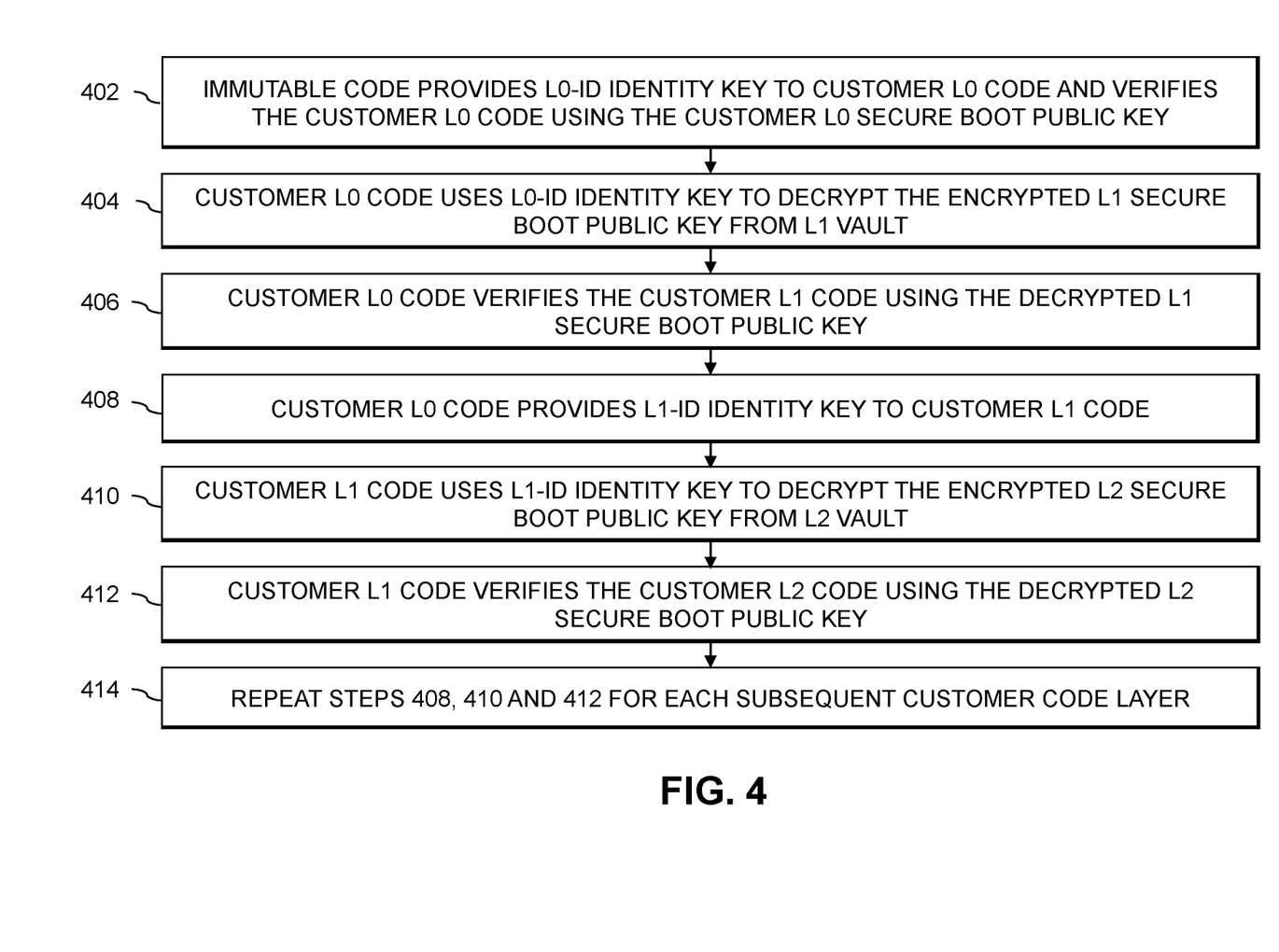
FIG. 4 is a flow chart illustrating an exemplary implementation of a run-time boot process in accordance with an illustrative embodiment.

FIG. 4 is a flow chart illustrating an exemplary implementation of a run-time boot process in accordance with an illustrative embodiment. In the example of FIG. 4, the immutable code of current security sub-system is the first code to boot. The immutable code provides the L0-ID identity key to the customer L0 code and verifies the customer L0 code using the customer L0 secure boot public key in step 402. The customer L0 code then uses the L0-ID identity key in step 404 to decrypt the encrypted L1 secure boot public key received from the L1 vault 240-1.

In step 406, the customer L0 code verifies the customer L1 code using the decrypted L1 secure boot public key and a secure boot signature verification (e.g., based on asymmetric cryptography) of the software code. In this manner, a current layer, such as layer L0 in the present example, uses the identity key of the current layer received from the prior layer (e.g., the immutable code 220 for layer 0) to decrypt and verify the secure boot public key of the next layer such as layer L1 in the present example. For example, in a secure boot mode, the security processor 210 can execute the customer L0 code to perform a signature verification of the customer L1 code using the decrypted L1 secure public key from step 404. If the signature is valid, the boot process of FIG. 4 continues.

The customer L0 software code provides the L1-ID identity key to the customer L0 software code in step 408. The customer L1 code uses the received L1-ID identity key in step 410 to decrypt the encrypted L2 Secure Boot public key from the L2 vault 240-2.

In step 412, the customer L1 code verifies the customer L2 code using the decrypted L2 Secure Boot public key, in a similar manner as step 406.

Steps 408, 410 and 412 are repeated in step 414, for each subsequent customer code layer (e.g., by incrementing each level number indicated in steps 408, 410 and 412 by one for each subsequent customer code layer, as would be apparent to a person of ordinary skill in the art).

Figure 5:
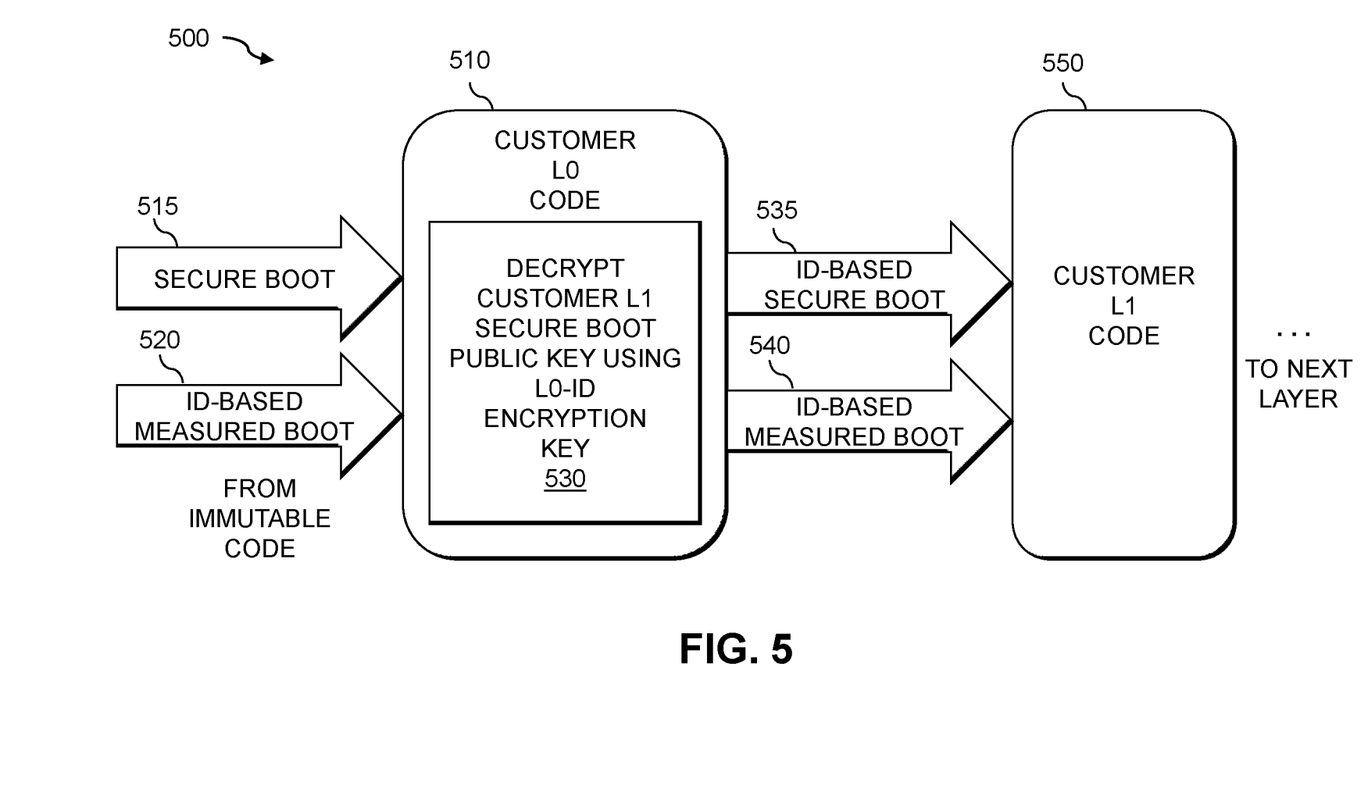
FIG. 5 illustrates a secure and measured boot process with respect to two successive layers of software code in accordance with an illustrative embodiment.

FIG. 5 illustrates a secure and measured boot process 500 with respect to two successive layers of software code 510, 550 in accordance with an illustrative embodiment. In the example of FIG. 5, during an execution of the boot process of FIG. 4, the customer L0 software code 510 is verified by the immutable code 220 in the secure boot of step 515 before the customer L0 software code 510 executes.

As noted above, the customer L0 software code is long lived (e.g., allowed to change but any change will result in a new identity, requiring a new provisioning of the security sub-system 200 (e.g., using the provisioning process of FIG. 3 or a similar process).

In the identity-based measured boot of step 520, the immutable code generates the L0-ID identity key for the customer L0 software code 510, passes the L0-ID identity key to the customer L0 software code 510 and then executes the customer L0 software code 510.

In the example of FIG. 5, the customer L0 software code can decrypt and provide the L1-ID identity key to the customer L1 software code 550 in the identity-based secure boot of step 535 if the customer L1 software code 550 is running on the same provisioned hardware (e.g., on the security sub-system 200 that was provisioned when the L1-ID identity key was generated; otherwise, the identity-based secure boot of step 535 fails. It is noted that only the expected customer L0 software code 510 that was provisioned by the process of FIG. 4 on the security sub-system 200 has the correct L0-ID identity key needed to decrypt the L1 secure boot key in step 530. For example, if software code associated with a different firmware image attempts to execute, such as L1 software code of a different customer, the identity-based secure boot of step 535 will fail because the L0-ID identity key needed to decrypt the L1 secure boot key will not be available.

In the identity-based measured boot of step 540, the customer L0 software code generates the L1-ID identity key for the customer L1 software code 550, passes the L1-ID identity key to the customer L1 software code 550 and then executes the customer L1 software code 550.

In this manner, each layer of the identity-based secure boot process can detect unexpected changes, as the identity key will change with each layer.

Figure 6:
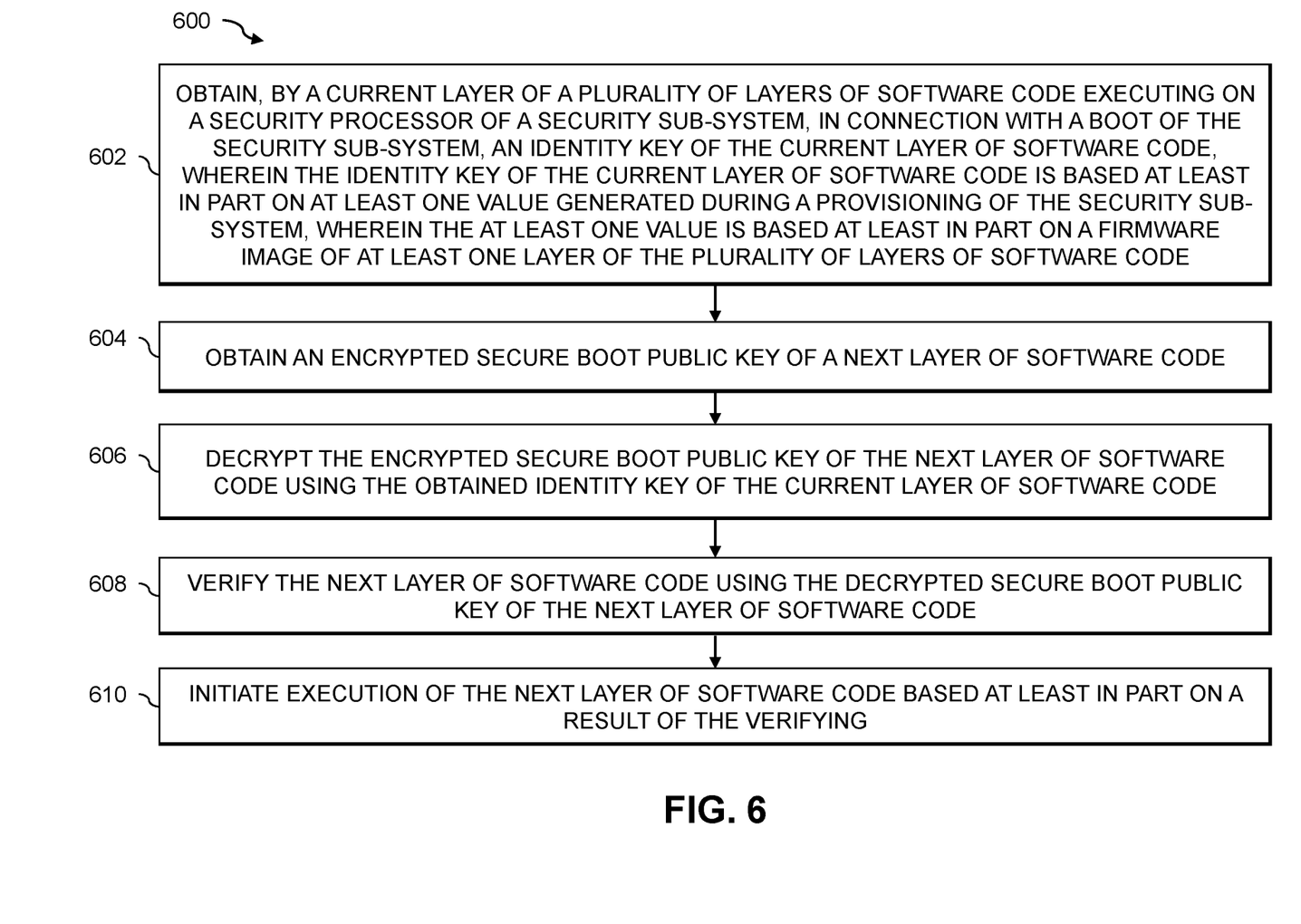
FIG. 6 is a flow chart illustrating an exemplary implementation of a process for identity-based verification of software code layers in accordance with an illustrative embodiment.

FIG. 6 is a flow chart illustrating an exemplary implementation of a process 600 for identity-based verification of software code layers in accordance with an illustrative embodiment. In the example of FIG. 6, a current layer of a plurality of layers of software code executing on a security processor of a security sub-system, in connection with a boot of the security sub-system, obtains an identity key of the current layer of software code in step 602, wherein the identity key of the current layer of software code is based at least in part on at least one value generated during a provisioning of the security sub-system, wherein the at least one value is based at least in part on a firmware image of at least one layer of the plurality of layers of software code.

An encrypted secure boot public key of a next layer of software code is obtained in step 604. In step 606, the encrypted secure boot public key of the next layer of software code is decrypted using the obtained identity key of the current layer of software code.

The next layer of software code is verified in step 608 using the decrypted secure boot public key of the next layer of software code. In step 610, an execution of the next layer of software code is initiated based at least in part on a result of the verifying.

In some embodiments, the identity key of the current layer of software code is based at least in part on one or more of (i) a first value generated by applying at least one function to one or more values stored in a secure memory of the security sub-system, and (ii) a second value generated by applying at least one function to the firmware image of the at least one layer of the plurality of layers of software code. The identity key of the current layer of software code may be generated by applying a key derivation function to the first value and the second value.

In one or more embodiments, an execution of the next layer of software code may be prevented responsive to the next layer of software code failing to verify. The verifying the next layer of software code may comprise verifying a signature associated with the next layer of software code. The decrypting the encrypted secure boot public key of the next layer of software code using the obtained identity key of the current layer of software code may require the identity key of the current layer of software code that is based at least in part on the at least one value generated during the provisioning of the security sub-system.

The particular processing operations and other network functionality described in conjunction with FIGS. 3, 4 and 6, for example, are presented by way of illustrative example only, and should not be construed as limiting the scope of the disclosure in any way. Alternative embodiments can use other types of processing operations for identity-based verification of software code layers. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

The disclosed techniques for identity-based verification of software code layers can be employed, for example, to detect an unexpected boot image during a boot process, such as a boot image associated with a different customer, or a boot image that was not tied to the same sub-system.

One or more embodiments of the disclosure provide improved methods, apparatus and computer program products for identity-based verification of software code layers. The foregoing applications and associated embodiments should be considered as illustrative only, and numerous other embodiments can be configured using the techniques disclosed herein, in a wide variety of different applications.

It should also be understood that the disclosed identity-based software code layer verification techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for identity-based verification of software code layers may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based software code layer verification engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based software code layer verification platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
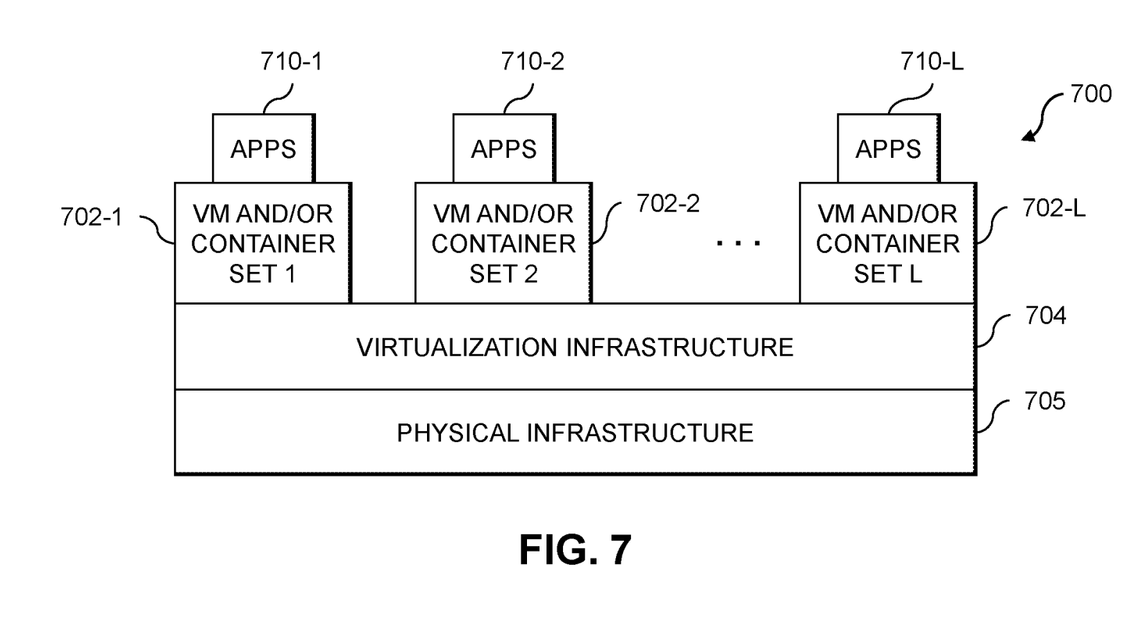
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide identity-based software code layer verification functionality of the type described above for one or more processes running on a given one of the VMs. For example, each of the VMs can implement identity-based software code layer verification control logic and associated identity-based boot functionality for one or more processes running on that particular VM.

An example of a hypervisor platform that may be used to implement a hypervisor within the virtualization infrastructure 704 is the VMware ° vSphere ° which may have an associated virtual infrastructure management system such as the VMware ° VCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide identity-based software code layer verification functionality of the type described above for one or more processes running on different ones of the containers. For example, a container host device supporting multiple containers of one or more container sets can implement one or more instances of identity-based software code layer verification control logic and associated identity-based boot functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a WAN, a LAN, a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an ASIC, an FPGA or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
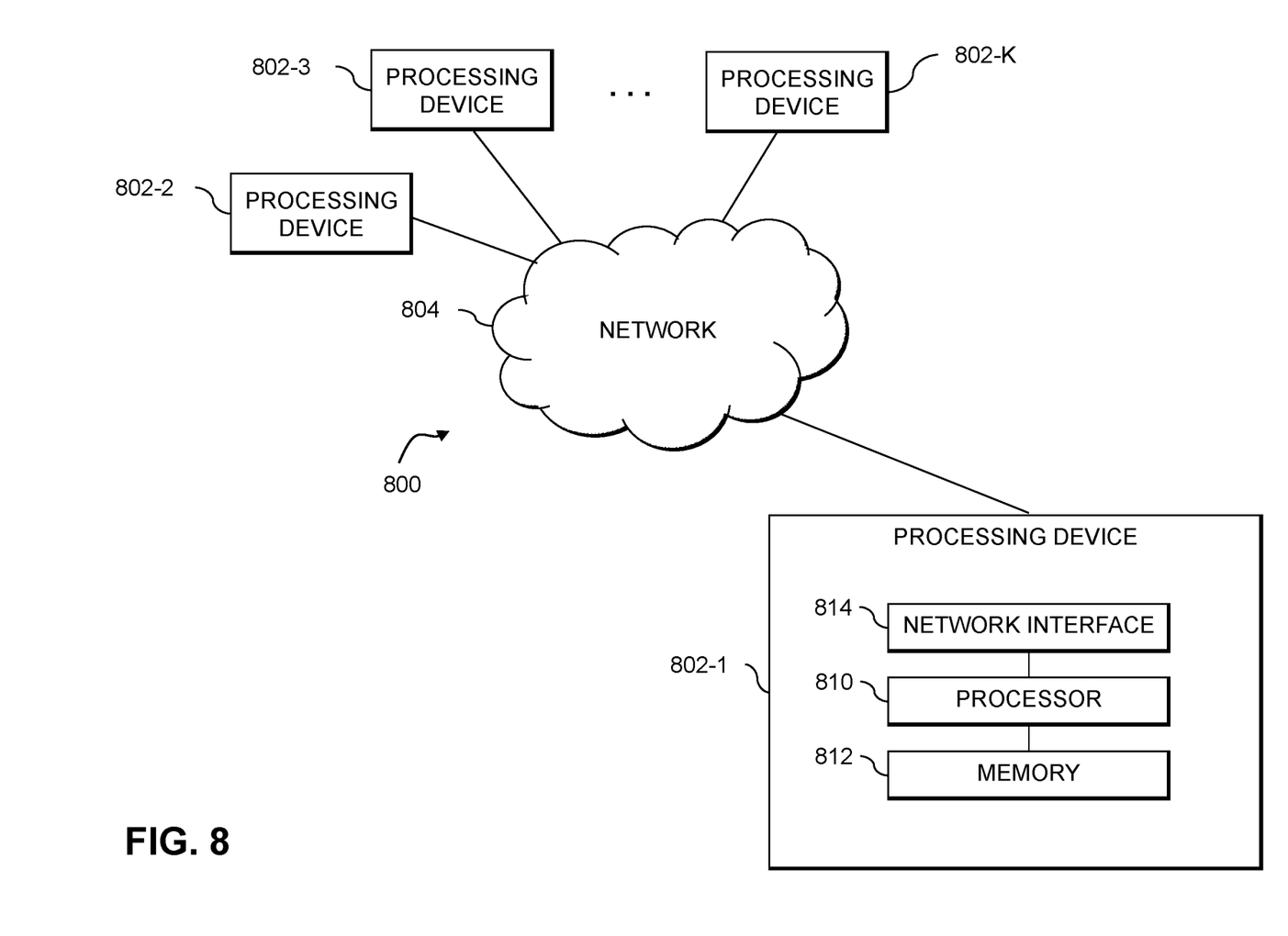
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   obtaining, by a current layer of a plurality of layers of software code executing on a security processor of a security sub-system, in connection with a boot of the security sub-system, an identity key of the current layer of software code, wherein the identity key of the current layer of software code is based at least in part on at least one value generated during a provisioning of the security sub-system, wherein the at least one value is based at least in part on a firmware image of at least one layer of the plurality of layers of software code;
   obtaining an encrypted secure boot public key of a next layer of software code;

decrypting the encrypted secure boot public key of the next layer of software code using the obtained identity key of the current layer of software code;

verifying the next layer of software code using the decrypted secure boot public key of the next layer of software code; and initiating execution of the next layer of software code based at least in part on a result of the verifying;

wherein the method is performed by at least one processing device comprising a processor coupled to a memory.

2. The method of claim 1, wherein the identity key of the current layer of software code is based at least in part on one or more of (i) a first value generated by applying at least one function to one or more values stored in a secure memory of the security sub-system, and (ii) a second value generated by applying at least one function to the firmware image of the at least one layer of the plurality of layers of software code.

3. The method of claim 2, wherein the identity key of the current layer of software code is generated by applying a key derivation function to the first value and the second value.

4. The method of claim 1, wherein the at least one value generated during the provisioning of the security sub-system comprises a substantially unique identifier of the security sub-system.

5. The method of claim 1, further comprising preventing an execution of the next layer of software code responsive to the next layer of software code failing to verify.

6. The method of claim 1, wherein the identity key of the current layer of software code is obtained from a vault, in a protected storage of the security sub-system, associated with the current layer of software code.

7. The method of claim 1, wherein the verifying the next layer of software code comprises verifying a signature associated with the next layer of software code.

8. The method of claim 1, wherein the decrypting the encrypted secure boot public key of the next layer of software code using the obtained identity key of the current layer of software code requires the identity key of the current layer of software code that is based at least in part on the at least one value generated during the provisioning of the security sub-system.

9. An apparatus comprising:

at least one processing device comprising a processor coupled to a memory;

the at least one processing device being configured to implement the following steps:

obtaining, by a current layer of a plurality of layers of software code executing on a security processor of a security sub-system, in connection with a boot of the security sub-system, an identity key of the current layer of software code, wherein the identity key of the current layer of software code is based at least in part on at least one value generated during a provisioning of the security sub-system, wherein the at least one value is based at least in part on a firmware image of at least one layer of the plurality of layers of software code;

obtaining an encrypted secure boot public key of a next layer of software code;

decrypting the encrypted secure boot public key of the next layer of software code using the obtained identity key of the current layer of software code;

verifying the next layer of software code using the decrypted secure boot public key of the next layer of software code; and initiating execution of the next layer of software code based at least in part on a result of the verifying.

10. The apparatus of claim 9, wherein the identity key of the current layer of software code is based at least in part on one or more of (i) a first value generated by applying at least one function to one or more values stored in a secure memory of the security sub-system, and (ii) a second value generated by applying at least one function to the firmware image of the at least one layer of the plurality of layers of software code.

11. The apparatus of claim 10, wherein the identity key of the current layer of software code is generated by applying a key derivation function to the first value and the second value.

12. The apparatus of claim 9, further comprising preventing an execution of the next layer of software code responsive to the next layer of software code failing to verify.

13. The apparatus of claim 9, wherein the verifying the next layer of software code comprises verifying a signature associated with the next layer of software code.

14. The apparatus of claim 9, wherein the decrypting the encrypted secure boot public key of the next layer of software code using the obtained identity key of the current layer of software code requires the identity key of the current layer of software code that is based at least in part on the at least one value generated during the provisioning of the security sub-system.

15. A non-transitory processor-readable storage medium having stored therein program code of one or more software programs, wherein the program code when executed by at least one processing device causes the at least one processing device to perform the following steps:

obtaining, by a current layer of a plurality of layers of software code executing on a security processor of a security sub-system, in connection with a boot of the security sub-system, an identity key of the current layer of software code, wherein the identity key of the current layer of software code is based at least in part on at least one value generated during a provisioning of the security sub-system, wherein the at least one value is based at least in part on a firmware image of at least one layer of the plurality of layers of software code;

obtaining an encrypted secure boot public key of a next layer of software code;

decrypting the encrypted secure boot public key of the next layer of software code using the obtained identity key of the current layer of software code;

verifying the next layer of software code using the decrypted secure boot public key of the next layer of software code; and initiating execution of the next layer of software code based at least in part on a result of the verifying.

16. The non-transitory processor-readable storage medium of claim 15, wherein the identity key of the current layer of software code is based at least in part on one or more of (i) a first value generated by applying at least one function to one or more values stored in a secure memory of the security sub-system, and (ii) a second value generated by applying at least one function to the firmware image of the at least one layer of the plurality of layers of software code.

17. The non-transitory processor-readable storage medium of claim 16, wherein the identity key of the current layer of software code is generated by applying a key derivation function to the first value and the second value.

18. The non-transitory processor-readable storage medium of claim 15, further comprising preventing an execution of the next layer of software code responsive to the next layer of software code failing to verify.

19. The non-transitory processor-readable storage medium of claim 15, wherein the verifying the next layer of software code comprises verifying a signature associated with the next layer of software code.

20. The non-transitory processor-readable storage medium of claim 15, wherein the decrypting the encrypted secure boot public key of the next layer of software code using the obtained identity key of the current layer of software code requires the identity key of the current layer of software code that is based at least in part on the at least one value generated during the provisioning of the security sub-system.

\* \* \* \* \*